US009303167B2

(12) United States Patent
Okerberg et al.

(10) Patent No.: US 9,303,167 B2
(45) Date of Patent: Apr. 5, 2016

(54) METHOD FOR PREPARING AND TREATING A STEEL SUBSTRATE

(71) Applicant: PPG Industries Ohio, Inc., Cleveland, OH (US)

(72) Inventors: Brian C. Okerberg, Gibsonia, PA (US); Richard M. Vargas, Mayfield Village, OH (US); Randall J. Brent, Solon, OH (US); John F. McIntyre, Bay Village, OH (US); Mark W. McMillen, Cabot, PA (US); Nathan J. Silvernail, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 59 days.

(21) Appl. No.: 13/832,057

(22) Filed: Mar. 15, 2013

(65) Prior Publication Data
US 2014/0272405 A1  Sep. 18, 2014

(51) Int. Cl.
*C09D 5/08* (2006.01)
*B05D 3/00* (2006.01)
*C25D 13/20* (2006.01)
*C23C 22/34* (2006.01)
*C23C 22/78* (2006.01)

(52) U.S. Cl.
CPC *C09D 5/08* (2013.01); *B05D 3/002* (2013.01); *C23C 22/34* (2013.01); *C23C 22/78* (2013.01); *C25D 13/20* (2013.01); *Y10T 428/273* (2015.01); *Y10T 428/31678* (2015.04)

(58) Field of Classification Search
USPC ........................................................ 427/299
See application file for complete search history.

(56) References Cited

U.S. PATENT DOCUMENTS

| | | | |
|---|---|---|---|
| 3,455,806 A | 7/1969 | Spoor | |
| 3,635,826 A | 1/1972 | Hamilton | |
| 3,663,389 A | 5/1972 | Koral et al. | |
| 3,749,657 A | 7/1973 | Le Bras et al. | |
| 3,793,278 A | 2/1974 | De Bona | |
| 3,912,548 A | 10/1975 | Faigen | |
| 3,928,157 A | 12/1975 | Suematsu et al. | |
| 3,947,338 A | 3/1976 | Jerabek et al. | |
| 3,947,339 A | 3/1976 | Jerabek et al. | |
| 3,962,165 A | 6/1976 | Bosso et al. | |
| 3,975,346 A | 8/1976 | Bosso et al. | |
| 3,984,299 A | 10/1976 | Jerabek | |
| 3,984,922 A | 10/1976 | Rosen | |
| 4,001,101 A | 1/1977 | Bosso et al. | |
| 4,009,115 A | 2/1977 | Binns | |
| 4,116,900 A | 9/1978 | Belanger | |
| 4,134,866 A | 1/1979 | Tominaga et al. | |
| 4,134,932 A | 1/1979 | Kempter et al. | |
| 4,148,670 A | 4/1979 | Kelly | |
| 4,238,594 A | 12/1980 | Pampouchidis | |
| 4,273,592 A * | 6/1981 | Kelly ......................... 428/472.2 |
| 4,313,769 A | 2/1982 | Frelin et al. | |
| 4,370,177 A | 1/1983 | Frelin et al. | |
| 4,668,421 A | 5/1987 | Dollman | |
| 4,728,456 A | 3/1988 | Yamasoe et al. | |
| 5,149,382 A | 9/1992 | Gray | |
| 5,209,788 A | 5/1993 | McMillen et al. | |
| 5,328,525 A | 7/1994 | Musingo et al. | |
| 5,449,415 A | 9/1995 | Dolan | |
| 5,653,823 A | 8/1997 | McMillen et al. | |
| 5,662,746 A | 9/1997 | Affinito | |
| 6,168,868 B1 | 1/2001 | Hauser et al. | |
| 6,616,868 B1 | 9/2003 | Gotoh et al. | |
| 6,749,694 B2 | 6/2004 | Greene et al. | |
| 6,797,387 B2 | 9/2004 | Ambrose et al. | |
| 6,875,800 B2 | 4/2005 | Vanier et al. | |
| 6,894,086 B2 | 5/2005 | Munro et al. | |
| 7,432,333 B2 | 10/2008 | Duffy et al. | |
| 7,470,752 B2 | 12/2008 | Duffy et al. | |
| 7,605,194 B2 | 10/2009 | Ferencz et al. | |
| 7,612,124 B2 | 11/2009 | Polk et al. | |
| 7,635,727 B2 | 12/2009 | Faler et al. | |
| 7,671,109 B2 | 3/2010 | Cheng et al. | |
| 7,745,514 B2 | 6/2010 | Cheng et al. | |
| 7,754,786 B2 | 7/2010 | Ferencz et al. | |
| 8,153,344 B2 | 4/2012 | Faler et al. | |
| 2004/0163736 A1 | 8/2004 | Matsukawa et al. | |
| 2005/0287348 A1 | 12/2005 | Faler et al. | |

(Continued)

FOREIGN PATENT DOCUMENTS

| | | |
|---|---|---|
| CA | 2087352 A1 | 1/1994 |
| EP | 0012463 A1 | 6/1980 |
| WO | 95/33869 A1 | 12/1995 |
| WO | WO 2004/101850 | 11/2004 |
| WO | 2005/000914 A1 | 1/2005 |
| WO | 2011/090691 A2 | 7/2011 |

OTHER PUBLICATIONS

"Scab Corrosion Creepback of Paint Systems on Metal Substrates", General Motors Engineering Standards, Materials and Processes—Procedures, General Motors Corporation, Mar. 1998.
Faler, Dennis L., "Aqueous Dispersions of Microparticles Having a Nanoparticulate Phase and Coating Compositions Containing the Same", U.S. Appl. No. 10/876,031, filed Jun. 24, 2004.
"Standard Practice for Operating Salt Spray (Fog) Apparatus", Designation B 117-07a, ASTM International.
"Section 4.1.2.3 Preliminary Treatments", BASF Handbook Lackiertechnik, Jan. 1, 2002, pp. 470-481.

*Primary Examiner* — Nathan T Leong
(74) *Attorney, Agent, or Firm* — Charles M. Yeomans; Alicia M. Passerin

(57) ABSTRACT

Disclosed are methods for treating metal substrates, including ferrous substrates, such as cold rolled steel and electrogalvanized steel. The methods include contacting the metal substrates with a conditioning composition including a free fluoride source and then depositing a pretreatment composition including a Group IIIB and/or IVB metal on a portion of the substrate contacted with the conditioning composition. Also disclosed are electrophoretically coated substrates treated by the methods.

15 Claims, No Drawings

(56) References Cited

U.S. PATENT DOCUMENTS

| | | |
|---|---|---|
| 2008/0112909 A1 | 5/2008 | Faler et al. |
| 2008/0280046 A1 | 11/2008 | Bryden et al. |
| 2009/0326098 A1 | 12/2009 | Ferencz et al. |
| 2010/0243108 A1 | 9/2010 | Karabin et al. |
| 2011/0189401 A1* | 8/2011 | Czika et al. .................. 427/304 |
| 2013/0081950 A1 | 4/2013 | Okerberg et al. |

* cited by examiner

METHOD FOR PREPARING AND TREATING A STEEL SUBSTRATE

FIELD OF THE INVENTION

The present invention relates to conditioning compositions generally and methods of conditioning metal substrates.

BACKGROUND OF THE INVENTION

The use of protective coatings on metal substrates for improved corrosion resistance and paint adhesion is common. Conventional techniques for coating such substrates include techniques that involve pretreating the metal substrate with a phosphate conversion coating and chrome-containing rinses. The use of such phosphate and/or chromate-containing compositions, however, imparts environmental and health concerns.

As a result, pretreatment compositions have been developed that are either free of chromate and/or phosphate, or that include phosphate at levels that are low enough to avoid the environmental and health concerns raised by conventional coating techniques. Such compositions are generally based on chemical mixtures that react with the substrate surface and bind to it to form a protective layer. For example, pretreatment compositions based on a Group IIIB or IVB metal compound have recently become more prevalent. Nevertheless, the corrosion resistance capability of these pretreatment compositions has generally been significantly inferior to conventional phosphate and/or chromium containing pretreatments.

It would be desirable to provide methods for treating a metal substrate that overcome at least some of the previously described drawbacks of the prior art, including the environmental drawbacks associated with the use of chromates and/or high levels of phosphates. It also would be desirable to provide methods for treating metal substrate that imparts corrosion resistance properties that are equivalent to, or even superior to, the corrosion resistance properties imparted through the use of conventional phosphate conversion coatings. It would also be desirable to provide related coated metal substrates.

SUMMARY OF THE INVENTION

In certain embodiments, the present invention is directed to a method for preparing and treating a substrate comprising: (a) contacting at least a portion of the substrate with a conditioning composition comprising a free fluoride source; and (b) depositing a pretreatment composition comprising a Group IIIB and/or Group IVB metal on at least a portion of the substrate contacted with the conditioning composition.

In other respects, the present invention is directed to a coated substrate comprising: a first treated surface layer comprising a conditioning composition comprising a free fluoride source; a second treated surface layer comprising a pretreatment composition comprising a Group IIIB and/or Group IV metal deposited over at least a portion of the first treated surface layer; and a coating composition deposited over at least a portion of the second treated surface layer.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As used herein, "includes" and like terms means "including without limitation."

The metal ions and metals referred to herein are those elements included in such designated group of the CAS Periodic Table of the Elements as is shown, for example, in Hawley's Condensed Chemical Dictionary, 15$^{th}$ Edition (2007).

As used herein, the term "Group IIIB and/or IVB metal" refers to an element that is in Group IIIB or Group IVB of the CAS Periodic Table of the Elements. Where applicable, the metal themselves may be used. In certain embodiments, Group IIIB and/or Group IVB metal compounds are used. As used herein, the term "Group IIIB and/or IVB metal compound" refers to compounds that include at least one element that is in Group IIIB or Group IVB of the CAS Period Table of the Elements.

As used herein, the term "conditioning composition" refers to a composition that, upon contact with a substrate, activates the surface for improved reaction with subsequent coating steps, which may, in certain embodiments, remove oxide layers and/or increase the surface area of the substrates.

As used herein, the term "pretreatment composition" refers to a composition that, upon contact with a substrate, reacts with and chemically alters the substrate surface and binds to it to form a protective layer.

Unless otherwise indicated, as used herein, "substantially free" means that a particular material is not purposefully added to a composition and only is present in trace amounts or as an impurity.

As used herein, the term "completely free" means that a composition does not comprise a particular material. That is, the composition comprises 0 weight percent of such material.

In certain embodiments, the method for preparing and treating a substrate comprises: (a) contacting at least a portion of the substrate with a conditioning composition comprising a free fluoride source; and (b) depositing a pretreatment composition comprising a Group IIIB and/or Group IVB metal on at least a portion of the substrate contacted with the conditioning composition.

Suitable metal substrates for use in the present invention include those that are often used in the assembly of automotive bodies, automotive parts, motorcycles, wheels, small metal parts, including fasteners, i.e., nuts, bolts, screws, pins, nails, clips, buttons, and the like, industrial structures and components such as appliances, including washers, dryers, refrigerators, stoves, dishwashers, and the like, agricultural equipment, lawn and garden equipment, air conditioning units, heat pump units, lawn furniture, and other articles. Specific examples of suitable metal substrates include, but are not limited to, cold rolled steel, hot rolled steel, steel coated with zinc metal, zinc compounds, or zinc alloys, such as electrogalvanized steel, hot-dipped galvanized steel, galvanealed steel, and steel plated with zinc alloy. Also, aluminum alloys, aluminum plated steel and aluminum alloy plated steel substrates may be used. Other suitable non-ferrous metals include copper and magnesium, as well as alloys of these materials. Moreover, the metal substrate being treated by the methods of the present invention may be a cut edge of a substrate that is otherwise treated and/or coated over the rest of its surface. The metal substrate treated in accordance with the methods of the present invention may be in the form of, for example, a sheet of metal or a fabricated part.

Contacting the metal substrate with the conditioning composition prior to deposition of the pretreatment composition on the metal substrate results in improved corrosion resistance of the substrate compared to substrates that have not been conditioned with the conditioning composition prior to deposition of the pretreatment composition.

In certain embodiments, the substrate to be treated in accordance with the methods of the present invention may first be cleaned to remove grease, dirt, or other extraneous matter. This is often done by employing mild or strong alkaline cleaners, such as are commercially available and conventionally used in metal pretreatment processes. Examples of alkaline cleaners suitable for use in the present invention include Chemkleen 163, Chemkleen 166M/C, Chemkleen 490MX, Chemkleen 2010LP, Chemkleen 166 HP, Chemkleen 166 M, Chemkleen 166 M/Chemkleen 171/11, and UTEC812, each of which are commercially available from PPG Industries, Inc. Such cleaners are often followed and/or preceded by a water rinse.

As mentioned above, in certain embodiments, the present invention comprises: (a) contacting at least a portion of the substrate with a conditioning composition comprising a free fluoride source. In certain embodiments, a bare substrate is contacted with the conditioning composition of the present invention.

Often, the conditioning composition may comprise a carrier, often an aqueous medium, so that the conditioning composition is in the form of a solution or dispersion of the free fluoride source in the carrier. In these embodiments, the solution or dispersion may be brought into contact with the substrate by any of a variety of known techniques, such as dipping or immersion, spraying, intermittent spraying, dipping followed by spraying, spraying followed by dipping, brushing, or roll-coating. In certain embodiments, the solution or dispersion when applied to the metal substrate is at a temperature ranging from 50 to 200° F., such as from 75-125° F. For example, the pretreatment process may be carried out at ambient or room temperature. The contact time is often from 15 seconds to 10 minutes, such as 30 seconds to 2 minutes.

In certain embodiments, the pH of the conditioning composition is below 7, such as 2.5 to 5 in certain embodiments. The pH of the conditioning composition may be adjusted by varying the amount of the dissolved complex metal fluoride ion present in the composition. In other embodiments, the pH of the conditioning composition may be adjusted using, for example, any acid or base as is necessary. In certain embodiments, the pH of the conditioning composition is maintained through the inclusion of a basic material, including water soluble and/or water dispersible bases, such as sodium hydroxide, sodium carbonate, potassium hydroxide, ammonium hydroxide, ammonia, and/or amines such as triethylamine, methylethyl amine, or combinations thereof.

As mentioned previously, the conditioning composition of the present invention comprises a free fluoride source. In certain embodiments, the free fluoride source may be a dissolved complex metal fluoride ion wherein the metal ion comprises a Group IIIA metal, Group IVA, Group IVB metal, or combinations thereof. The metal can be provided in ionic form, which can be easily dissolved in an aqueous composition at an appropriate pH, as would be recognized by those skilled in the art. The metal may be provided by the addition of specific compounds of the metals, such as their soluble acids and salts. The metal ion of the dissolved complex metal fluoride ion is capable of converting to a metal oxide upon application to a metal substrate. In certain embodiments, the dissolved complex metal fluoride ion source comprises $H_2TiF_6$, $H_2ZrF_6$, $H_2HfF_6$, $H_2SiF_6$, $H_2GeF_6$, $H_2SnF_6$, or combinations thereof.

In other embodiments, the free fluoride source may be a fluoride acid or a fluoride salt. Suitable examples include, but are not limited to, ammonium fluoride, ammonium bifluoride, hydrofluoric acid, fluorosilicic acid, fluorozirconic acid, fluorotitanic acid, ammonium and alkali metal fluorosilicates, fluorozirconates, fluorotitanates, zirconium fluoride, sodium fluoride, sodium bifluoride, potassium fluoride, potassium bifluoride, and the like.

In certain embodiments, the free fluoride source of the conditioning composition is present in an amount ranging from 10 to 5000 parts per million ("ppm") metal, such as from 100 to 2000 ppm, based on a total weight of all of the ingredients in the conditioning composition. The amount of free fluoride in the conditioning composition can range between the recited values inclusive of the recited values.

In certain embodiments, the conditioning composition is compatible with the pretreatment composition. As used herein, the term "compatible," when used with respect to the conditioning composition, contemplates that as a substrate is treated according to the methods of the present invention, there may be drag-in from the bath containing the conditioning composition to the bath containing the pretreatment composition and means that the ingredients comprising the conditioning composition, and the concentrations in which they are present, do not interfere with the deposition of the Group IIIB and/or Group IV metal film having a coverage (total film weight) of at least 10 mg/m², such as at least 100 mg/m², on the metal substrate if such drag-in occurs. In certain embodiments, the free fluoride source comprising the conditioning composition is compatible with the pretreatment composition, particularly in embodiments in which the fluoride levels are controlled in the bath containing the pretreatment composition.

In certain embodiments, the conditioning composition is formulated to replenish the pretreatment composition. As used herein, the term "replenish," when used with respect to the conditioning composition, contemplates that as a substrate is treated according to the methods of the present invention, there may be drag-in from the bath containing the conditioning composition to the bath containing the pretreatment composition and means that the ingredients comprising the conditioning composition maintain at least one ingredient of the pretreatment composition at a desired concentration if such drag-in occurs.

In certain embodiments of the methods of the present invention, the conditioning composition comprises a fluoride source wherein the free fluoride is present in the bath of the conditioning composition in an amount that is compatible with the pretreatment composition and/or is sufficient to replenish the free fluoride comprising the pretreatment composition.

In certain embodiments, the conditioning composition of the present invention is substantially, or in some case, completely free of oxidants. As used herein, the term "substantially free," when used in reference to the absence of oxidant in the conditioning composition, means that any oxidant is present in the conditioning composition in an amount of less than 200 mmol. As used herein, the term "completely free," when used in reference to the absence of oxidant in the conditioning composition, means that there is no oxidant in the conditioning composition at all.

In certain embodiments, the conditioning composition of the present invention comprises a Group IIIB and/or Group IVB metal.

In certain embodiments, the Group IIIB and/or IVB metal compound used in the conditioning composition may be a compound of zirconium, titanium, hafnium, yttrium, cerium, or a mixture thereof. Suitable compounds of zirconium include, but are not limited to, hexafluorozirconic acid, alkali metal and ammonium salts thereof, ammonium zirconium carbonate, zirconyl nitrate, zirconyl sulfate, zirconium carboxylates and zirconium hydroxy carboxylates, such as hydrofluorozirconic acid, zirconium acetate, zirconium oxalate, ammonium zirconium glycolate, ammonium zirconium lactate, ammonium zirconium citrate, and mixtures thereof. Suitable compounds of titanium include, but are not limited to, fluorotitanic acid and its salts. A suitable compound of hafnium includes, but is not limited to, hafnium nitrate. A suitable compound of yttrium includes, but is not limited to, yttrium nitrate. A suitable compound of cerium includes, but is not limited to, cerous nitrate.

In certain embodiments, the Group IIIB and/or IVB metal is present in the conditioning composition in an amount of 10 to 4000 ppm metal, such as 75 to 200 ppm, based on the total weight of all of the ingredients in the conditioning composition. The amount of Group IIIB and/or IVB metal in the conditioning composition can range between the recited values inclusive of the recited values.

In certain embodiments, the conditioning composition also may include a source of phosphate ions, for example, phosphate ions may be added in an amount of greater than 2 ppm up to 100 ppm, such as for example 20 ppm to 40 ppm or for example 30 ppm.

In certain embodiments, the conditioning composition of the present invention may be substantially or, in some cases, completely free of phosphate ions. As used herein, the term "substantially free," when used in reference to the absence of phosphate ions in the conditioning composition, means that phosphate ions are not present in the composition to such an extent that the phosphate ions cause a burden on the environment. For example, phosphate ions may be present in the pretreatment composition in an amount of less than 2 ppm. That is, phosphate ions are not substantially used and the formation of sludge, such as iron phosphate and zinc phosphate, formed in the case of using a treating agent based on zinc phosphate, is eliminated.

In certain embodiments, the conditioning composition is substantially, or in some cases, completely free of chromate. As used herein, the term "substantially free," when used in reference to the absence of chromate in the conditioning composition, means that any chromate is present in the conditioning composition in an amount of less than 5 ppm. As used herein, the term "completely free," when used in reference to the absence of chromate in the conditioning composition, means that there is no chromate in the conditioning composition at all.

As mentioned previously, the conditioning composition of the present invention is provided as an aqueous solution and/or dispersion. In these embodiments, the conditioning composition further comprises water. Water may be used to dilute the conditioning composition of the present invention. Any appropriate amount of water may be present in the conditioning composition to provide the desired concentration of other ingredients.

As mentioned previously, in certain embodiments, the present invention comprises: (b) depositing a pretreatment composition comprising a Group III B and/or Group IV B metal on at least a portion of the substrate contacted with the conditioning composition. In certain embodiments, the substrate is not rinsed between steps (a) and (b). In certain other embodiments, the substrate is rinsed between steps (a) and (b).

Often, the pretreatment composition may comprise a carrier, often an aqueous medium, so that the composition is in the form of a solution or dispersion of a Group IIIB or IVB metal compound in the carrier. In these embodiments, the solution or dispersion may be brought into contact with the substrate by any of a variety of known techniques, such as dipping or immersion, spraying, intermittent spraying, dipping followed by spraying, spraying followed by dipping, brushing, or roll-coating. In certain embodiments, the solution or dispersion when applied to the metal substrate is at a temperature ranging from 60 to 185° F. (15 to 85° C.). For example, the pretreatment process may be carried out at ambient or room temperature. The contact time is often from 2 seconds to 5 minutes, such as 30 seconds to 2 minutes.

In certain embodiments, the pH of the pretreatment composition ranges from 1 to 6, such as from 2 to 5.5. The pH of the pretreatment composition may be adjusted using, for example, any acid or base as is necessary. In certain embodiments, the pH of the solution is maintained through the inclusion of a basic material, including water soluble and/or water dispersible bases, such as sodium hydroxide, sodium carbonate, potassium hydroxide, ammonium hydroxide, ammonia, and/or amines such as triethylamine, methylethyl amine, or mixtures thereof.

In certain embodiments, the Group IIIB and/or IVB metal compound used in the pretreatment composition may be a compound of zirconium, titanium, hafnium, yttrium, cerium, or a mixture thereof. Suitable compounds of zirconium include, but are not limited to, hexafluorozirconic acid, alkali metal and ammonium salts thereof, ammonium zirconium carbonate, zirconyl nitrate, zirconyl sulfate, zirconium carboxylates and zirconium hydroxy carboxylates, such as hydrofluorozirconic acid, zirconium acetate, zirconium oxalate, ammonium zirconium glycolate, ammonium zirconium lactate, ammonium zirconium citrate, and mixtures thereof. Suitable compounds of titanium include, but are not limited to, fluorotitanic acid and its salts. A suitable compound of hafnium includes, but is not limited to, hafnium nitrate. A suitable compound of yttrium includes, but is not limited to, yttrium nitrate. A suitable compound of cerium includes, but is not limited to, cerous nitrate.

In certain embodiments, the Group IIIB and/or IVB metal may be present in the pretreatment composition in an amount of 10 to 500 parts per million ("ppm") metal, such as 40 to 250 ppm, based on the total weight of all of the ingredients in the pretreatment composition. The amount of Group IIIB and/or IVB metal in the pretreatment composition can range between the recited values inclusive of the recited values.

In certain embodiments, the pretreatment compositions may also comprise free fluoride. The source of free fluoride in the pretreatment compositions of the present invention can vary. For example, in some cases, the free fluoride may derive from the Group IIIB and/or IVB metal compound used in the pretreatment composition, such as is the case, for example, with hexafluorozirconic acid. As the Group IIIB and/or IVB metal is deposited upon the metal substrate during the pretreatment process, fluorine in the hexafluorozirconic acid will become free fluoride and the level of free fluoride in the pretreatment composition will, if left unchecked, increase with time as metal is pretreated with the pretreatment composition of the present invention.

In addition, the source of free fluoride in the pretreatment compositions of the present invention may include a compound other than the Group IIIB and/or IVB metal compound. Non-limiting examples of such sources include HF, $NH_4F$, $NH_4HF_2$, NaF, and $NaHF_2$. As used herein, the term "free fluoride" refers to isolated fluoride ions. In certain embodiments, the free fluoride is present in the pretreatment composition in an amount of 5 to 250 ppm, such as 25 to 100 ppm, based on the total weight of the ingredients in the pretreatment composition. The amount of free fluoride in the pretreatment composition can range between the recited values inclusive of the recited values. In certain embodiments, the free fluoride ions may be present in the pretreatment composition in a weight ratio of free fluoride ions to the Group IIIB and/or Group IV metal of 40 to 1, in some cases 8 to 1.

In certain embodiments, the pretreatment compositions may also comprise an electropositive metal. As used herein, the term "electropositive metal" refers to metals that are more electropositive than the metal substrate. This means that, for purposes of the present invention, the term "electropositive metal" encompasses metals that are less easily oxidized than the metal of the metal substrate that is being treated. As will be appreciated by those skilled in the art, the tendency of a metal to be oxidized is called the oxidation potential, is expressed in volts, and is measured relative to a standard hydrogen electrode, which is arbitrarily assigned an oxidation potential of zero. The oxidation potential for several elements is set forth in the table below. An element is less easily oxidized than another element if it has a voltage value, E*, in the following table, that is greater than the element to which it is being compared.

| Element | Half-cell reaction | Voltage, E* |
|---|---|---|
| Potassium | $K^+ + e \rightarrow K$ | −2.93 |
| Calcium | $Ca^{2+} + 2e \rightarrow Ca$ | −2.87 |
| Sodium | $Na^+ + e \rightarrow Na$ | −2.71 |
| Magnesium | $Mg^{2+} + 2e \rightarrow Mg$ | −2.37 |
| Aluminum | $Al^{3+} + 3e \rightarrow Al$ | −1.66 |
| Zinc | $Zn^{2+} + 2e \rightarrow Zn$ | −0.76 |
| Iron | $Fe^{2+} + 2e \rightarrow Fe$ | −0.44 |
| Nickel | $Ni^{2+} + 2e \rightarrow Ni$ | −0.25 |
| Tin | $Sn^{2+} + 2e \rightarrow Sn$ | −0.14 |

-continued

| Element | Half-cell reaction | Voltage, E* |
|---|---|---|
| Lead | $Pb^{2+} + 2e \rightarrow Pb$ | −0.13 |
| Hydrogen | $2H^+ + 2e \rightarrow H_2$ | −0.00 |
| Copper | $Cu^{2+} + 2e \rightarrow Cu$ | 0.34 |
| Mercury | $Hg_2^{2+} + 2e \rightarrow 2Hg$ | 0.79 |
| Silver | $Ag^+ + e \rightarrow Ag$ | 0.80 |
| Gold | $Au^{3+} + 3e \rightarrow Au$ | 1.50 |

Thus, as will be apparent, when the metal substrate comprises one of the materials listed earlier, such as cold rolled steel, hot rolled steel, steel coated with zinc metal, zinc compounds, or zinc alloys, hot-dipped galvanized steel, galvannealed steel, steel plated with zinc alloy, aluminum alloys, aluminum plated steel, aluminum alloy plated steel, magnesium and magnesium alloys, suitable electropositive metals for deposition thereon include, for example, nickel, copper, silver, and gold, as well mixtures thereof.

In certain embodiments in which the electropositive metal comprises copper, both soluble and insoluble compounds may serve as the source of copper in the pretreatment compositions. For example, the supplying source of copper ions in the pretreatment composition may be a water soluble copper compound. Specific examples of such materials include, but are not limited to, copper cyanide, copper potassium cyanide, copper sulfate, copper nitrate, copper pyrophosphate, copper thiocyanate, disodium copper ethylenediaminetetraacetate tetrahydrate, copper bromide, copper oxide, copper hydroxide, copper chloride, copper fluoride, copper gluconate, copper citrate, copper lauroyl sarcosinate, copper formate, copper acetate, copper propionate, copper butyrate, copper lactate, copper oxalate, copper phytate, copper tartarate, copper malate, copper succinate, copper malonate, copper maleate, copper benzoate, copper salicylate, copper aspartate, copper glutamate, copper fumarate, copper glycerophosphate, sodium copper chlorophyllin, copper fluorosilicate, copper fluoroborate and copper iodate, as well as copper salts of carboxylic acids in the homologous series formic acid to decanoic acid, copper salts of polybasic acids in the series oxalic acid to suberic acid, and copper salts of hydroxycarboxylic acids, including glycolic, lactic, tartaric, malic and citric acids.

When copper ions supplied from such a water-soluble copper compound are precipitated as an impurity in the form of copper sulfate, copper oxide, etc., it may be desirable to add a complexing agent that suppresses the precipitation of copper ions, thus stabilizing them as a copper complex in the solution.

In certain embodiments, the copper compound may be added as a copper complex salt such as $K_3Cu(CN)_4$ or Cu-EDTA, which can be present stably in the pretreatment composition on its own, but it is also possible to form a copper complex that can be present stably in the pretreatment composition by combining a complexing agent with a compound that is difficulty soluble on its own. Examples thereof include a copper cyanide complex formed by a combination of CuCN and KCN or a combination of CuSCN and KSCN or KCN, and a Cu-EDTA complex formed by a combination of $CuSO_4$ and EDTA.2Na.

With regard to the complexing agent, a compound that can form a complex with copper ions can be used; examples thereof include inorganic compounds such as cyanide compounds and thiocyanate compounds, and polycarboxylic acids, and specific examples thereof include ethylenediaminetetraacetic acid, salts of ethylenediaminetetraacetic acid such as dihydrogen disodium ethylenediaminetetraacetate dihydrate, aminocarboxylic acids such as nitrilotriacetic acid and iminodiacetic acid, oxycarboxylic acids such as citric acid and tartaric acid, succinic acid, oxalic acid, ethylenediaminetetramethylenephosphonic acid, and glycine.

In certain embodiments, the electropositive metal is present in the pretreatment composition in an amount of less than 500 ppm, such as 5 or 150 ppm to 10 or 50 ppm, based on the total weight of all of the ingredients in the pretreatment composition. The amount of electropositive metal in the pretreatment composition can range between the recited values inclusive of the recited values.

In certain embodiments, the pretreatment composition may also comprise molybdenum. In certain embodiments, the source of molybdenum used in the pretreatment composition may be in the form of a salt, including sodium molybdate, calcium molybdate, potassium molybdate, ammonium molybdate, molybdenum chloride, molybdenum acetate, molybdenum sulfamate, molybdenum formate, or molybdenum lactate. In certain embodiments, the inclusion of molybdenum in the pretreatment composition may result in improved corrosion resistance of steel and steel substrates. In certain embodiments, the molybdenum may be present in the pretreatment composition in an amount of 5 to 500 ppm, such as 5 to 150 ppm, based on the total weight of the ingredients in the pretreatment composition. The amount of molybdenum in the pretreatment composition can range between the recited values inclusive of the recited values. In certain embodiments, the molar ratio of the Group IIIB and/or IVB metal to the molybdenum is between 100:1 and 1:10, for example, between 30:1 and 11.

In certain embodiments, the pretreatment compositions may also comprise lithium. In certain embodiments, the source of lithium used in the pretreatment composition may be in the form of a salt, including lithium nitrate, lithium sulfate, lithium fluoride, lithium chloride, lithium hydroxide, lithium carbonate, and lithium iodide. In certain embodiments, the lithium may be present in the pretreatment composition in an amount of 5 to 500 ppm, such as 25 to 125 ppm, based on the total weight of the ingredients in the pretreatment composition. In certain embodiments, the lithium may be present in the pretreatment composition in an amount of less than 200 ppm. The amount of lithium in the pretreatment composition can range between the recited values inclusive of the recited values.

In certain embodiments, the pretreatment composition is substantially or, in some cases, completely free of phosphate ions. As used herein, the term "substantially free," when used in reference to the absence of phosphate ions in the pretreatment composition, means that phosphate ions are not present in the composition to such an extent that the phosphate ions cause a burden on the environment. For example, phosphate ions may be present in the pretreatment composition in a trace amount of less than 10 ppm. That is, phosphate ions are not substantially used and the formation of sludge, such as iron phosphate and zinc phosphate, formed in the case of using a treating agent based on zinc phosphate, is eliminated.

In certain embodiments, the pretreatment composition also may include a source of phosphate ions. For example, phosphate ions may be added in an amount of greater than 10 ppm up to 100 ppm, such as for example 20 ppm to 40 ppm or for example 30 ppm.

In certain embodiments, the pretreatment composition is substantially, or in some cases, completely free of chromate. As used herein, the term "substantially free," when used in reference to the absence of chromate in the pretreatment composition, means that any chromate is present in the pretreatment composition in a trace amount of less than 5 ppm. As used herein, the term "completely free," when used in reference to the absence of chromate in the pretreatment composition, means that there is no chromate in the pretreatment composition at all.

In certain embodiments, the pretreatment composition also may comprise a resinous binder. Suitable resins include reaction products of one or more alkanolamines and an epoxy-functional material containing at least two epoxy groups, such as those disclosed in U.S. Pat. No. 5,653,823. In some cases, such resins contain beta hydroxy ester, imide, or sulfide functionality, incorporated by using dimethylolpropionic acid, phthalimide, or mercaptoglycerine as an additional reactant in the preparation of the resin. Alternatively, the reaction product is that of the diglycidyl ether of Bisphenol A (commercially available from Shell Chemical Company as EPON 880), dimethylol propionic acid, and diethanolamine in a 0.6 to 5.0:0.05 to 5.5:1 mole ratio. Other suitable resinous binders include water soluble and water dispersible polyacrylic acids as disclosed in U.S. Pat. Nos. 3,912,548 and 5,328,525; phenol formaldehyde resins as described in U.S. Pat. No. 5,662,746; water soluble polyamides such as those disclosed in WO 95/33869; copolymers of maleic or acrylic acid with allyl ether as described in Canadian patent application 2,087,352; and water soluble and dispersible resins including epoxy resins, aminoplasts, phenol-formaldehyde resins, tannins, and polyvinyl phenols as discussed in U.S. Pat. No. 5,449,415.

In these embodiments of the present invention, the resinous binder often may be present in the pretreatment composition in an amount of 0.005 percent to 30 percent by weight, such as 0.5 to 3 percent by weight, based on the total weight of the ingredients in the composition.

In other embodiments, however, the pretreatment composition may be substantially free or, in some cases, completely free of any resinous binder. As used herein, the term "substantially free", when used with reference to the absence of resinous binder in the pretreatment composition, means that any resinous binder is present in the pretreatment composition in a trace amount of less than 0.005 percent by weight. As used herein, the term "completely free" means that there is no resinous binder in the pretreatment composition at all.

The pretreatment composition may optionally contain other materials such as nonionic surfactants and auxiliaries conventionally used in the art of pretreatment. In an aqueous medium, water dispersible organic solvents, for example, alcohols with up to about 8 carbon atoms such as methanol, isopropanol, and the like, may be present; or glycol ethers such as the monoalkyl ethers of ethylene glycol, diethylene glycol, or propylene glycol, and the like. When present, water dispersible organic solvents are typically used in amounts up to about ten percent by volume, based on the total volume of aqueous medium.

Other optional materials include surfactants that function as defoamers or substrate wetting agents. Anionic, cationic, amphoteric, and/or nonionic surfactants may be used. Defoaming surfactants are often present at levels up to 1 weight percent, such as up to 0.1 percent by weight, and wetting agents are typically present at levels up to 2 percent, such as up to 0.5 percent by weight, based on the total weight of the pretreatment composition.

In certain embodiments, the pretreatment composition also may comprise a silane, such as, for example, an amino group-containing silane coupling agent, a hydrolysate thereof, or a polymer thereof, as described in United States Patent Application Publication No. 2004/0163736 A1 at [0025] to [0031], the cited portion of which being incorporated herein by reference. In other embodiments of the present invention, however, the pretreatment composition is substantially free, or, in some cases, completely free of any such amino group-containing silane coupling agent. As used herein, the term "substantially free", when used with reference to the absence of amino-group containing silane coupling agent in the pretreatment composition, means that any amino-group containing silane coupling agent, hydrolysate thereof, or polymer thereof that is present in the pretreatment composition is present in a trace amount of less than 5 ppm. As used herein, the term "completely free" means that there is no amino-group containing silane coupling agent, hydrolysate thereof, or polymer thereof in the pretreatment composition at all.

In certain embodiments, the pretreatment composition also may comprise a reaction accelerator, such as nitrite ions, nitro-group containing compounds, hydroxylamine sulfate, persulfate ions, sulfite ions, hyposulfite ions, peroxides, iron (III) ions, citric acid iron compounds, bromate ions, perchlorinate ions, chlorate ions, chlorite ions as well as ascorbic acid, citric acid, tartaric acid, malonic acid, succinic acid and salts thereof. Specific examples of suitable materials and their amounts are described in United States Patent Application Publication No. 2004/0163736 A1 at [0032] to [0041], the cited portion of which being incorporated herein by reference.

In certain embodiments, the film coverage of the residue of the pretreatment coating composition generally ranges from 1 to 1000 milligrams per square meter (mg/m$^2$), for example, from 10 to 400 mg/m$^2$. In certain embodiments, the thickness of the pretreatment coating may be less than 1 micrometer, for example from 1 to 500 nanometers, or from 10 to 300 nanometers. Following contact with the pretreatment solution, the substrate optionally may be rinsed with water and dried. In certain embodiments, the substrate may be dried for 0.5 to 30 minutes in an oven at 15 to 200° C. (60 to 400° F.), such as for 10 minutes at 70° F.

Optionally, after the pretreatment step, the substrate may then be contacted with a post-rinse solution. Post-rinse solutions, in general, utilize certain solubilized metal ions or other inorganic materials (such as phosphates or simple or complex fluorides) to enhance the corrosion protection of pretreated metal substrates. These post-rinse solutions may be chrome containing or non-chrome containing post-rinse solutions. Suitable non-chrome post-rinse solutions that may be utilized in the present invention are disclosed in U.S. Pat. Nos. 5,653,823; 5,209,788; and 5,149,382; all assigned to PPG Industries, Inc. and herein incorporated by reference. In addition, organic materials (resinous or otherwise) such as phosphitized epoxies, base-solubilized, carboxylic acid containing polymers, at least partially neutralized interpolymers of hydroxyl-alkyl esters of unsaturated carboxylic acids, and amine salt-group containing resins (such as acid-solubilized reaction products of polyepoxides and primary or secondary amines) may also be utilized alone or in combination with solubilized metal ions and/or other inorganic materials. After the optional post-rinse (when utilized), the substrate may be rinsed with water prior to subsequent processing.

In certain embodiments, the method of the present invention further comprises depositing a coating composition onto at least a portion of the substrate contacted with the pretreatment composition.

In certain embodiments of the methods of the present invention, after the substrate is contacted with the pretreatment composition, it then may be contacted with a coating composition comprising a film-forming resin. Any suitable technique may be used to contact the substrate with such a coating composition, including, for example, brushing, dipping, flow coating, spraying and the like. In certain embodiments, however, as described in more detail below, such contacting comprises an electrocoating step wherein an electrodepositable composition is deposited onto the metal substrate by electrodeposition. In certain other embodiments, as described in more detail below, such contacting comprises a powder coating step. In certain other embodiments, the coating composition may be a liquid coating composition.

As used herein, the term "film-forming resin" refers to resins that can form a self-supporting continuous film on at least a horizontal surface of a substrate upon removal of any diluents or carriers present in the composition or upon curing at ambient or elevated temperature. Conventional film-forming resins that may be used include, without limitation, those typically used in automotive OEM coating compositions, automotive refinish coating compositions, industrial coating compositions, architectural coating compositions, coil coating compositions, and aerospace coating compositions, among others.

In certain embodiments, the coating composition comprises a thermosetting film-forming resin. As used herein, the term "thermosetting" refers to resins that "set" irreversibly upon curing or crosslinking, wherein the polymer chains of the polymeric components are joined together by covalent bonds. This property is usually associated with a cross-linking reaction of the composition constituents often induced, for example, by heat or radiation. Curing or crosslinking reactions also may be carried out under ambient conditions. Once cured or crosslinked, a thermosetting resin will not melt upon the application of heat and is insoluble in solvents. In other embodiments, the coating composition comprises a thermoplastic film-forming resin. As used herein, the term "thermoplastic" refers to resins that comprise polymeric components that are not joined by covalent bonds and thereby can undergo liquid flow upon heating and are soluble in solvents.

As previously indicated, in certain embodiments, the substrate is contacted with a coating composition comprising a film-forming resin by an electrocoating step wherein an electrodepositable composition is deposited onto the metal substrate by electrodeposition. In the process of electrodeposition, the metal substrate being treated, serving as an electrode, and an electrically conductive counter electrode are placed in contact with an ionic, electrodepositable composition. Upon passage of an electric current between the electrode and counter electrode while they are in contact with the electrodepositable composition, an adherent film of the electrodepositable composition will deposit in a substantially continuous manner on the metal substrate.

Electrodeposition is usually carried out at a constant voltage in the range of from 1 volt to several thousand volts, typically between 50 and 500 volts. Current density is usually between 1.0 ampere and 15 amperes per square foot (10.8 to 161.5 amperes per square meter) and tends to decrease quickly during the electrodeposition process, indicating formation of a continuous self-insulating film.

The electrodepositable composition utilized in certain embodiments of the present invention often comprises a resinous phase dispersed in an aqueous medium wherein the resinous phase comprises: (a) an active hydrogen group-containing ionic electrodepositable resin, and (b) a curing agent having functional groups reactive with the active hydrogen groups of (a).

In certain embodiments, the electrodepositable compositions utilized in certain embodiments of the present invention contain, as a main film-forming polymer, an active hydrogen-containing ionic, often cationic, electrodepositable resin. A wide variety of electrodepositable film-forming resins are known and can be used in the present invention so long as the polymers are "water dispersible," i.e., adapted to be solubilized, dispersed or emulsified in water. The water dispersible polymer is ionic in nature, that is, the polymer will contain anionic functional groups to impart a negative charge or, as is often preferred, cationic functional groups to impart a positive charge.

Examples of film-forming resins suitable for use in anionic electrodepositable compositions are base-solubilized, carboxylic acid containing polymers, such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, unsaturated carboxylic acid and at least one other ethylenically unsaturated monomer. Still another suitable electrodepositable film-forming resin comprises an alkyd-aminoplast vehicle, i.e., a vehicle containing an alkyd resin and an amine-aldehyde resin. Yet another anionic electrodepositable resin composition comprises mixed esters of a resinous polyol, such as is described in U.S. Pat. No. 3,749,657 at col. 9, lines 1 to 75 and col. 10, lines 1 to 13, the cited portion of which being incorporated herein by reference. Other acid functional polymers can also be used, such as phosphatized polyepoxide or phosphatized acrylic polymers as are known to those skilled in the art.

As aforementioned, it is often desirable that the active hydrogen-containing ionic electrodepositable resin (a) is cationic and capable of deposition on a cathode. Examples of such cationic film-forming resins include amine salt group-containing resins, such as the acid-solubilized reaction products of polyepoxides and primary or secondary amines, such as those described in U.S. Pat. Nos. 3,663,389; 3,984,299; 3,947,338; and 3,947,339. Often, these amine salt group-containing resins are used in combination with a blocked isocyanate curing agent. The isocyanate can be fully blocked, as described in U.S. Pat. No. 3,984,299, or the isocyanate can be partially blocked and reacted with the resin backbone, such as is described in U.S. Pat. No. 3,947,338. Also, one-component compositions as described in U.S. Pat. No. 4,134,866 and DE-OS No. 2,707,405 can be used as the film-forming resin. Besides the epoxy-amine reaction products, film-forming resins can also be selected from cationic acrylic resins, such as those described in U.S. Pat. Nos. 3,455,806 and 3,928,157.

Besides amine salt group-containing resins, quaternary ammonium salt group-containing resins can also be employed, such as those formed from reacting an organic polyepoxide with a tertiary amine salt as described in U.S. Pat. Nos. 3,962,165; 3,975,346; and 4,001,101. Examples of other cationic resins are ternary sulfonium salt group-containing resins and quaternary phosphonium salt-group containing resins, such as those described in U.S. Pat. Nos. 3,793,278 and 3,984,922, respectively. Also, film-forming resins which cure via transesterification, such as described in European Application No. 12463 can be used. Further, cationic compositions prepared from Mannich bases, such as described in U.S. Pat. No. 4,134,932, can be used.

In certain embodiments, the resins present in the electrodepositable composition are positively charged resins which contain primary and/or secondary amine groups, such as described in U.S. Pat. Nos. 3,663,389; 3,947,339; and 4,116,900. In U.S. Pat. No. 3,947,339, a polyketimine derivative of a polyamine, such as diethylenetriamine or triethylenetetraamine, is reacted with a polyepoxide. When the reaction product is neutralized with acid and dispersed in water, free primary amine groups are generated. Also, equivalent products are formed when polyepoxide is reacted with excess polyamines, such as diethylenetriamine and triethylenetetraamine, and the excess polyamine vacuum stripped from the reaction mixture, as described in U.S. Pat. Nos. 3,663,389 and 4,116,900.

In certain embodiments, the active hydrogen-containing ionic electrodepositable resin is present in the electrodepositable composition in an amount of 1 to 60 percent by weight, such as 5 to 25 percent by weight, based on total weight of the electrodeposition bath.

As indicated, the resinous phase of the electrodepositable composition often further comprises a curing agent adapted to react with the active hydrogen groups of the ionic electrodepositable resin. For example, both blocked organic polyisocyanate and aminoplast curing agents are suitable for use in the present invention, although blocked isocyanates are often preferred for cathodic electrodeposition.

Aminoplast resins, which are often the preferred curing agent for anionic electrodeposition, are the condensation products of amines or amides with aldehydes. Examples of suitable amine or amides are melamine, benzoguanamine, urea and similar compounds. Generally, the aldehyde employed is formaldehyde, although products can be made from other aldehydes, such as acetaldehyde and furfural. The condensation products contain methylol groups or similar alkylol groups depending on the particular aldehyde employed. Often, these methylol groups are etherified by reaction with an alcohol, such as a monohydric alcohol containing from 1 to 4 carbon atoms, such as methanol, ethanol, isopropanol, and n-butanol. Aminoplast resins are commercially available from American Cyanamid Co. under the trademark CYMEL and from Monsanto Chemical Co. under the trademark RESIMENE.

The aminoplast curing agents are often utilized in conjunction with the active hydrogen containing anionic electrodepositable resin in amounts ranging from 5 percent to 60 percent by weight, such as from 20 percent to 40 percent by weight, the percentages based on the total weight of the resin solids in the electrodepositable composition. As indicated, blocked organic polyisocyanates are often used as the curing agent in cathodic electrodeposition compositions. The polyisocyanates can be fully blocked as described in U.S. Pat. No. 3,984,299 at col. 1, lines 1 to 68, col. 2, and col. 3, lines 1 to 15, or partially blocked and reacted with the polymer backbone as described in U.S. Pat. No. 3,947,338 at col. 2, lines 65 to 68, col. 3, and col. 4 lines 1 to 30, the cited portions of which being incorporated herein by reference. By "blocked" is meant that the isocyanate groups have been reacted with a compound so that the resultant blocked isocyanate group is stable to active hydrogens at ambient temperature but reactive with active hydrogens in the film forming polymer at elevated temperatures usually between 90° C. and 200° C.

Suitable polyisocyanates include aromatic and aliphatic polyisocyanates, including cycloaliphatic polyisocyanates and representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates, such as triisocyanates can be used. An example would include triphenylmethane-4,4',4"-triisocyanate. Isocyanate ( )-prepolymers with polyols such as neopentyl glycol and trimethylolpropane and with polymeric polyols such as polycaprolactone diols and triols (NCO/OH equivalent ratio greater than 1) can also be used.

The polyisocyanate curing agents are typically utilized in conjunction with the active hydrogen containing cationic electrodepositable resin in amounts ranging from 5 percent to 60 percent by weight, such as from 20 percent to 50 percent by weight, the percentages based on the total weight of the resin solids of the electrodepositable composition.

In certain embodiments, the coating composition comprising a film-forming resin also comprises yttrium. In certain embodiments, yttrium is present in such compositions in an amount from 10 to 10,000 ppm, such as not more than 5,000 ppm, and, in some cases, not more than 1,000 ppm, of total yttrium (measured as elemental yttrium). Both soluble and insoluble yttrium compounds may serve as the source of yttrium. Examples of yttrium sources suitable for use in lead-free electrodepositable coating compositions are soluble organic and inorganic yttrium salts such as yttrium acetate, yttrium chloride, yttrium formate, yttrium carbonate, yttrium sulfamate, yttrium lactate and yttrium nitrate. When the yttrium is to be added to an electrocoat bath as an aqueous solution, yttrium nitrate, a readily available yttrium compound, is a preferred yttrium source. Other yttrium compounds suitable for use in electrodepositable compositions are organic and inorganic yttrium compounds such as yttrium oxide, yttrium bromide, yttrium hydroxide, yttrium molybdate, yttrium sulfate, yttrium silicate, and yttrium oxalate. Organoyttrium complexes and yttrium metal can also be used. When the yttrium is to be incorporated into an electrocoat bath as a component in the pigment paste, yttrium oxide is often the preferred source of yttrium.

The electrodepositable compositions described herein are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 1.0 and usually less than 0.5 microns, often less than 0.15 micron.

The concentration of the resinous phase in the aqueous medium is often at least 1 percent by weight, such as from 2 to 60 percent by weight, based on total weight of the aqueous dispersion. When such compositions are in the form of resin concentrates, they generally have a resin solids content of 20 to 60 percent by weight based on weight of the aqueous dispersion.

The electrodepositable compositions described herein are often supplied as two components: (1) a clear resin feed, which includes generally the active hydrogen-containing ionic electrodepositable resin, i.e., the main film-forming polymer, the curing agent, and any additional water-dispersible, non-pigmented components; and (2) a pigment paste, which generally includes one or more colorants (described below), a water-dispersible grind resin which can be the same or different from the main-film forming polymer, and, optionally, additives such as wetting or dispersing aids. Electrodeposition bath components (1) and (2) are dispersed in an aqueous medium which comprises water and, usually, coalescing solvents.

As aforementioned, besides water, the aqueous medium may contain a coalescing solvent. Useful coalescing solvents are often hydrocarbons, alcohols, esters, ethers and ketones. The preferred coalescing solvents are often alcohols, polyols and ketones. Specific coalescing solvents include isopropanol, butanol, 2-ethylhexanol, isophorone, 2-methoxypentanone, ethylene and propylene glycol and the monoethyl monobutyl and monohexyl ethers of ethylene glycol. The amount of coalescing solvent is generally between 0.01 and 25 percent, such as from 0.05 to 5 percent by weight based on total weight of the aqueous medium.

As mentioned above, in certain other embodiments, after the substrate is contacted with the pretreatment composition, it then may be contacted with a powder coating composition. As used herein, "powder coating composition" refers to a coating composition which is completely free of water and/or solvent. Accordingly, the powder coating composition disclosed herein is not synonymous to waterborne and/or solventborne coating compositions known in the art.

In certain embodiments, the powder coating composition comprises (a) a film forming polymer having a reactive functional group; and (b) a curing agent that is reactive with the functional group. Examples of powder coating compositions that may be used in the present invention include the ENVIROCRON line of powder coating compositions (commercially available from PPG Industries, Inc.) as well as the powder coating compositions described in U.S. Pat. Nos. 7,470,752, 7,432,333, and 6,797,387.

Suitable film forming polymers that may be used in the powder coating composition of the present invention comprise a (poly)ester (e.g., polyester triglycidyl isocyanurate), a (poly)urethane, an isocyanurate, a (poly)urea, a (poly)epoxy, an anhydride, an acrylic, a (poly)ether, a (poly)sulfide, a (poly)amine, a (poly)amide, (poly)vinyl chloride, (poly)olefin, (poly)vinylidene fluoride, or combinations thereof.

In certain embodiments, the reactive functional group of the film forming polymer of the powder coating composition comprises hydroxyl, carboxyl, isocyanate (including blocked (poly)isocyanate), primary amine, secondary amine, amide, carbamate, urea, urethane, vinyl, unsaturated ester, maleimide, fumarate, anhydride, hydroxyl alkylamide, epoxy, or combinations thereof.

Suitable curing agents (crosslinking agents) that may be used in the powder coating composition of present invention comprise an aminoplast resin, a polyisocyanate, a blocked polyisocyanate, a polyepoxide, a polyacid, a polyol, or combinations thereof.

In certain embodiments, the powder coating composition, when cured, is a low gloss coating. As used herein, "low gloss" means a value of less than 15 at 60° when measured by BYK-Gardner glossmeter (available from BYK-Gardner USA).

As mentioned above, in certain embodiments, the coating composition may be a liquid coating composition. As used herein, "liquid coating composition" refers to a coating composition which contains a portion of water and/or solvent. Accordingly, the liquid coating composition disclosed herein is synonymous to waterborne and/or solventborne coating compositions known in the art.

In certain embodiments, the liquid coating composition comprises (a) a film forming polymer having a reactive functional group; and (b) a curing agent that is reactive with the functional group. In other embodiments, the liquid coating may contain a film forming polymer that may react with oxygen in the air or coalesce into a film with the evaporation of water and/or solvents. These film forming mechanisms may require or be accelerated by the application of heat or some type of radiation such as Ultraviolet or Infrared. Examples of liquid coating compositions that may be used in the present invention include the SPECTRACRON® line of solventbased coating compositions, the AQUACRON® line of waterbased coating compositions, and the RAYCRON® line of UV cured coatings (all commercially available from PPG Industries, Inc.).

Suitable film forming polymers that may be used in the liquid coating composition of the present invention may comprise a (poly)ester, an alkyd, a (poly)urethane, an isocyanurate, a (poly)urea, a (poly)epoxy, an anhydride, an acrylic, a (poly)ether, a (poly)sulfide, a (poly)amine, a (poly)amide, (poly)vinyl chloride, (poly)olefin, (poly)vinylidene fluoride, (poly)siloxane, or combinations thereof.

In certain embodiments, the reactive functional group of the film forming polymer of the liquid coating composition may comprise hydroxyl, carboxyl, isocyanate (including blocked (poly)isocyanate), primary amine, secondary amine, amide, carbamate, urea, urethane, vinyl, unsaturated ester, maleimide, fumarate, anhydride, hydroxyl alkylamide, epoxy, or combinations thereof.

Suitable curing agents (crosslinking agents) that may be used in the liquid coating composition of the present invention may comprise an aminoplast resin, a polyisocyanate, a blocked polyisocyanate, a polyepoxide, a polyacid, a polyol, or combinations thereof.

In addition, a colorant and, if desired, various additives such as surfactants, wetting agents or catalyst can be included in the coating composition (electrodepositable, powder, or liquid) comprising a film-forming resin. As used herein, the term "colorant" means any substance that imparts color and/or other opacity and/or other visual effect to the composition. The colorant can be added to the composition in any suitable form, such as discrete particles, dispersions, solutions and/or flakes. A single colorant or a mixture of two or more colorants can be used.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In certain embodiments, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain embodiments, a photosensitive composition and/or photochromic composition, which reversibly alters its color when exposed to one or more light sources, can be used. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In certain embodiments, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In certain embodiments, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with certain embodiments of the present invention, have minimal migration out of the coating.

Example photosensitive compositions and/or photochromic compositions and methods for making them are identified in U.S. application Ser. No. 10/892,919 filed Jul. 16, 2004, incorporated herein by reference.

In general, the colorant can be present in the coating composition in any amount sufficient to impart the desired visual and/or color effect. The colorant may comprise from 1 to 65 weight percent, such as from 3 to 40 weight percent or 5 to 35 weight percent, with weight percent based on the total weight of the composition.

After deposition, the coating is often heated to cure the deposited composition. The heating or curing operation is often carried out at a temperature in the range of from 120 to 250° C., such as from 120 to 190° C., for a period of time ranging from 10 to 60 minutes. In certain embodiments, the thickness of the resultant film is from 10 to 50 microns.

As has been indicated throughout the foregoing description, the methods and coated substrates of the present invention do not, in certain embodiments, include the deposition of a crystalline phosphate, such as zinc phosphate, or a chromate. As a result, the environmental drawbacks associated with such materials can be avoided. Nevertheless, the methods of the present invention have been shown to provide coated substrates that are, in at least some cases, resistant to corrosion at a level comparable to, in some cases even superior to, methods wherein such materials are used.

Illustrating the invention are the following examples that are not to be considered as limiting the invention to their details. All parts and percentages in the examples, as well as throughout the specification, are by weight unless otherwise indicated.

EXAMPLES

Example 1

Test panels were spray cleaned for 1-2 minutes in 2010LP alkaline cleaner (commercially available from PPG Industries, Inc., Cleveland, Ohio) followed by the experimental rinse. Panels were rinsed with DI water and then contacted with the experimental conditioning rinse (spray or immersion), prepared as described below. After the experimental conditioning rinse, the panels were pretreated in Zircobond (a zirconium-based pretreatment composition commercially available from PPG Industries, Inc., Cleveland, Ohio). Chemfil buffer (an alkaline buffer commercially available from PPG Industries, Inc., Cleveland, Ohio) was used to adjust the pH and ammonium bifluoride was used to adjust the fluoride level of the pretreatment composition. The pretreated panels were dried with hot air and electrocoated with ED7000P (a cathodic electrocoat that contains 509 g of E6433, 86 g of E6434P, and 404 g water and that is commercially available from PPG Industries) and baked for 25 minutes in a 350° F. oven. Panels were submitted for GM cyclic corrosion test GMW14872. Standard test panels were also prepared using 2 minutes spray cleaning of CK2010LP alkaline cleaner and rinsed with DI water, followed by Zircobond and ED7000P electrocoat.

Experimental conditioning rinses as described in Table 1 were prepared by adding hexafluorozirconic acid to DI water. Chemfos AFL and Chemfil buffer were used to adjust free fluoride and pH, respectively.

TABLE 1

Treatment Protocols

| Cleaner | Conditioning Rinse | Pretreatment Composition | Rinse pH | Rinse Temp (° F.) | Rinse Free Fluoride (ppm) | Rinse Zr (ppm) | Scribe Creep (mm) |
|---|---|---|---|---|---|---|---|
| CK2010LP | None | Zircobond | — | — | — | — | 4.7* |
| CK2010LP | A | Zircobond | 3.5 | 80 | 100 | 180 | 3.8* |
| CK2010LP | A, no DI rinse after | Zircobond | 3.5 | 80 | 100 | 180 | 3.5* |
| CK2010LP | D | Zircobond | 3 | 80 | 150 | 200 | 3.4 |
| CK2010LP | E | Zircobond | 4 | 80 | 150 | 600 | 3.5 |
| CK2010LP | None | Zircobond | — | — | — | — | 7** |
| CK2010LP | B | Zircobond | 3.5 | 80 | 150 | 600 | 4.5** |
| CK2010LP | C | Zircobond | 2.5 | 120 | 150 | 600 | 5.6** |

*CRS, panels were subjected to 60 cycles of GMW14872, 4 minute spray conditioner
**HDG, panels were subjected to 80 cycles of GMW14872, 2 minute immersion conditioner Panels treated with the conditioning rinses A to E prior to pretreatment with zirconium exhibit significantly decreased scribe creep, demonstrating significantly improved corrosion resistance.

Example 2

Test panels of hot rolled steel were spray cleaned for two minutes using Ultrax EC812 (2% by vol.) alkaline cleaner (commercially available from PPG Industries, Inc., Euclid, Ohio) at 130° F. followed by immersing in city water for 90 seconds at ambient temperature, then in either city water or the experimental conditioning rinse F (prepared as described below) at ambient temperature for thirty seconds. The panels were then immersed for two minutes in an 85° F. aqueous pretreatment composition containing 200 ppm zirconium with additives for corrosion protection and iron control (3% by vol. Zircobond 4200DM, commercially available from PPG Industries, Inc., Cleveland, Ohio). Chemfil Buffer (an alkaline product commercially available from PPG Industries, Inc., Cleveland, Ohio) was used to adjust the pH up to approximately 4.7 prior to immersing the parts. The pretreated panels were then immersed for thirty seconds in overflowing water and for fifteen seconds in deionized water prior to drying via infrared heat for three minutes. The coated samples were then electrocoated with a low bake temperature cathodic epoxy P659 (commercially available from PPG Industries) and baked for 20 minutes in a 250° F. oven. Panels were scribed and submitted to a 500 hour corrosion test according to ASTM B 117. Data from an average of three panels for each conditioning rinse are shown in Table 2.

Experimental conditioning rinse F was prepared by blending a neutralized solution of ammonium bifluoride (Chemfos AFL, commercially available from PPG Industries, Cleveland, Ohio) into city water at 0.25% by volume to yield 275 ppm total fluoride.

TABLE 2

| Conditioning Rinse | Pretreatment Composition | Average Scribe Creep (mm) |
|---|---|---|
| City water | 3% ZB4200DM, 2 minutes | 2 |
| F | 3% ZB4200DM, 2 minutes | 1 |

As illustrated in Table 2, hot roll steel panels treated with the experimental conditioning rinse F prior to pretreatment with zirconium exhibit significantly decreased scribe creep, demonstrating significantly improved adhesion loss, e.g., 50 percent and therefore improved corrosion resistance. This level of adhesion loss exceeds industry standards (typically 2-3 mm) and therefore provides a margin of passing that would not be available otherwise.

Example 3

Test panels of cold rolled steel were immersion cleaned for ten minutes in Ultrax EC893D (5% by vol.) alkaline cleaner (commercially available from PPG Industries, Inc., Cleveland, Ohio) at 130° F. followed by a city water rinse for three minutes at ambient temperature, then the experimental conditioning rinse (prepared as described below) at ambient temperature for two minutes. The panels were then immersed for two and a half minutes in an 75° F. aqueous pretreatment solution containing 200 ppm zirconium with additives for corrosion protection and iron control (3% by vol. Zircobond 4200DM, commercially available from PPG Industries, Inc., Cleveland, Ohio). Prior to this application, Chemfil Buffer (alkaline product PPG Industries) was used to adjust the pH up to approximately 4.8. The pretreated panels were then rinsed for three minutes in overflowing city water and thirty seconds in overflowing deionized water before drying with a convection heater for one minute. The coated samples were then electrocoated with low cure temperature cathodic P659 (commercially available from PPG Industries, Inc., Cleveland, Ohio) and baked for 20 minutes in a 250° F. oven. Panels were scribed and submitted to a 500 hour corrosion test according to ASTM B117. Data from an average of three panels for each conditioning rinse are shown in Table 3.

Experimental conditioning rinse G was prepared by adding 378 milliliters of hexafluorozirconic acid solution (45% by weight) to one gallon of city water.

TABLE 3

| Conditioning Rinse | Pretreatment Composition | Average Scribe Creep (mm) |
|---|---|---|
| City water | 3% ZB4200DM, 2.5 minutes | 2.5 |
| G | 3% ZB4200DM, 2.5 minutes | 1.8 |

As illustrated in Table 3, cold rolled steel panels treated with the experimental conditioning rinse G prior to pretreatment with zirconium exhibit significantly decreased scribe creep, demonstrating significantly improved adhesion loss, e.g., 28 percent and therefore improved corrosion resistance. This level of adhesion loss exceeds industry standards (typically 2-3 mm) and therefore provides a margin of passing that would not be available otherwise.

Example 4

Test panels (cold rolled steel) were spray cleaned for 30 seconds in Chemkleen 611L (2% by vol.) alkaline cleaner (commercially available from PPG Industries, Inc., Cleveland, Ohio) at 140° F. followed by a city water rinse for thirty seconds at ambient temperature, then the experimental conditioning rinse (prepared as described below) at ambient temperature for thirty seconds, also spray applied.

After the experimental conditioning rinse, the panels were spray pretreated for 60 seconds using a 90° F. aqueous solution containing 70 ppm zirconium with additives for corrosion protection and iron control (2.5% by vol. Zircobond 4200SM commercially available from PPG Industries, Inc., Cleveland, Ohio). Prior to application, Chemfil Buffer (an alkaline product commercially available from PPG Industries, Inc., Cleveland, Ohio) was used to adjust the pH to 4.8. The pretreated panels were spray rinsed for twenty seconds using city water, followed by deionized water for five seconds. They were then dried via an infrared heater for one minute. The coated samples were then electrocoated with P6000CX (a cathodic e-coat commercially available from PPG Industries, Inc., Cleveland, Ohio) and baked for 25 minutes in a 350° F. oven. Panels were scribed and submitted for 20 cycles GM9511P testing. Data from an average of three panels for each conditioning rinse are shown in Table 4.

The experimental conditioning rinse H was prepared by adding ammonium bifluoride salt at 0.5% by weight to water to produce 3,330 ppm of total fluoride in a bath at pH 3.2.

TABLE 4

| Conditioning Rinse | Pretreatment Composition | Average Scribe Creep (mm) |
|---|---|---|
| City water | 2.5% ZB4200DM, 1 minute | 5.6 |
| H | 2.5% ZB4200DM, 1 minute | 2.7 |

As illustrated in Table 4, cold rolled steel panels treated with the experimental conditioning rinse H prior to pretreatment with zirconium exhibit significantly decreased scribe creep, demonstrating significantly improved adhesion loss, e.g., 51 percent and therefore improved corrosion resistance.

Example 5

Test panels (cold rolled steel) were spray cleaned for 45 seconds in CK611L (2% by vol.) alkaline cleaner (commercially available from PPG Industries, Inc., Cleveland, Ohio) at 135° F. followed by a city water rinse for twenty seconds at ambient temperature, then the experimental conditioning rinses I-N (described below) at ambient temperature for thirty seconds. After the experimental conditioning rinse, the panels were spray pretreated for sixty seconds using a 70 ppm zirconium bath provided from a 2.5% (vol.) solution of Zircobond 4200SM (commercially available from PPG Industries, Inc., Cleveland, Ohio). Prior to coating, Chemfil Buffer (an alkaline product commercially available from PPG Industries, Inc., Cleveland, Ohio) was used to adjust the pH to approximately 4.7. The pretreated panels were then spray rinsed for thirty seconds in city water and 5 seconds in deionized water prior to drying via infrared heaters for one minute. The coated samples were then electrocoated with P6000CX (commercially available from PPG Industries, Inc., Cleveland, Ohio) and baked for 25 minutes in a 350° F. oven. Panels were submitted for 40 cycles GMW14872 testing or 2000 hours neutral salt spray (ASTM B117). Data from an average of three panels for each conditioning rinse are shown in Table 5.

The experimental conditioning rinses I—N were prepared by adding Chemfos AFL (PPG Industries, Inc.) to city water in amounts needed to produce the desired ppm of total fluoride (see Table 5). Because the source of city water was a cold lake, the conditioning rinse baths for conditioning rinses I-M were approximately 50-55° F. In conditioning rinse N, the city water used to prepare the conditioning rinse N was warmed to 75° F.

TABLE 5

| Conditioning Rinse | Pretreatment Composition | Average Scribe creep (mm) P6000CX cathodic electrocoat | |
|---|---|---|---|
| | | GMW14872 40 cycles | ASTM B117 2,000 hours |
| City water only | CF710 (Zn phosphate) | 3.8 | 3.2 |
| City water only | ZB4200SM | 3.9 | 2.8 |
| I (50 ppm F) | ZB4200SM | 3.8 | 2.7 |
| J (100 ppm F) | ZB4200SM | 3.7 | 2.4 |
| K (200 ppm F) | ZB4200SM | 3.5 | 2.1 |
| L (275 ppm F) | ZB4200SM | 2.9 | 2.3 |
| M (350 ppm F) | ZB4200SM | 2.6 | 2.1 |
| N (275 ppm F) | ZB4200SM | 2.3 | 2.0 |

As illustrated in Table 5, cold rolled steel panels treated with the experimental conditioning rinses I-M prior to pretreatment with zirconium exhibit significantly decreased scribe creep, demonstrating significantly improved adhesion loss, e.g., 51 percent and therefore improved corrosion resistance compared to panels that were only treated with zinc phosphate or zirconium pretreatment compositions. Warming the conditioning rinse bath to room temperature further improved the performance of conditioning rinse N when the panels were subjected to the GMW14872 test.

We claim:

1. A method for preparing and pretreating a substrate comprising:
   (a) contacting at least a portion of the substrate with a conditioning composition comprising a free fluoride source, wherein the pH value of the conditioning composition is in a range from 2.5 to 5, and wherein, upon contact with the substrate, the conditioning composition activates the surface for improved reaction with subsequent coating steps and removes oxide layers when oxide layers are present on the substrate surface; and
   (b) depositing a pretreatment composition comprising a Group IIIB and/or Group IVB metal on at least a portion of the substrate contacted with the conditioning composition, wherein, upon contact with the substrate, the pretreatment composition reacts with and chemically alters the substrate surface and binds to it to form a protective layer.

2. The method of claim 1, wherein the conditioning composition is formulated to replenish the pretreatment composition.

3. The method of claim 1, wherein the conditioning composition is compatible with the pretreatment composition.

4. The method of claim 1, wherein the conditioning composition is substantially free of oxidants.

5. The method of claim 1 further comprising:
   (c) depositing a coating composition onto at least a portion of the substrate contacted with the pretreatment composition.

6. The method of claim 5, wherein the coating composition is an electrocoat.

7. The method of claim 5, wherein the coating composition is a powder coat.

8. The method of claim 5, wherein the coating composition is a liquid.

9. The method of claim 1, wherein the free fluoride of the conditioning composition comprises from 10 to 5000 parts per million, based on a total weight of the conditioning composition.

10. The method of claim 1, wherein the free fluoride of the conditioning composition comprises from 100 to 2000 parts per million, based on a total weight of the conditioning composition.

11. The method of claim 1, wherein the free fluoride source comprises hexafluorozirconic acid, hexafluorotitanic acid, salts thereof, ammonium bifluoride, or combinations thereof.

12. The method of claim 1, wherein the conditioning composition further comprises a Group IIIB and/or Group IVB metal.

13. The method of claim 1, wherein the pretreatment composition comprises a zirconium-based agent.

14. The method of claim 1, wherein the pretreatment composition further comprises a free fluoride source.

15. The method of claim 14, wherein the free fluoride source comprises ammonium bifluoride.

* * * * *